Figure 1:
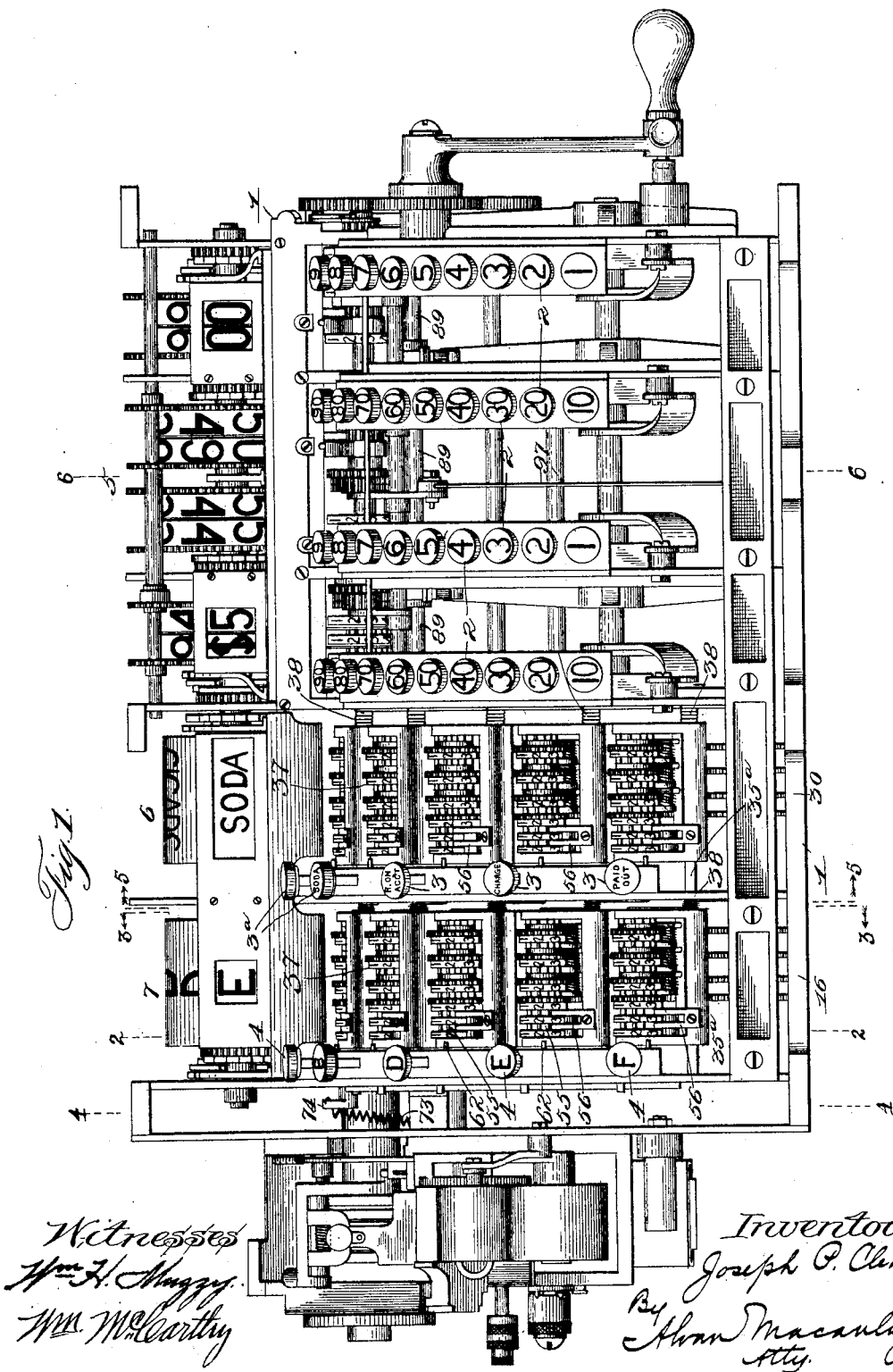
Figure 2:
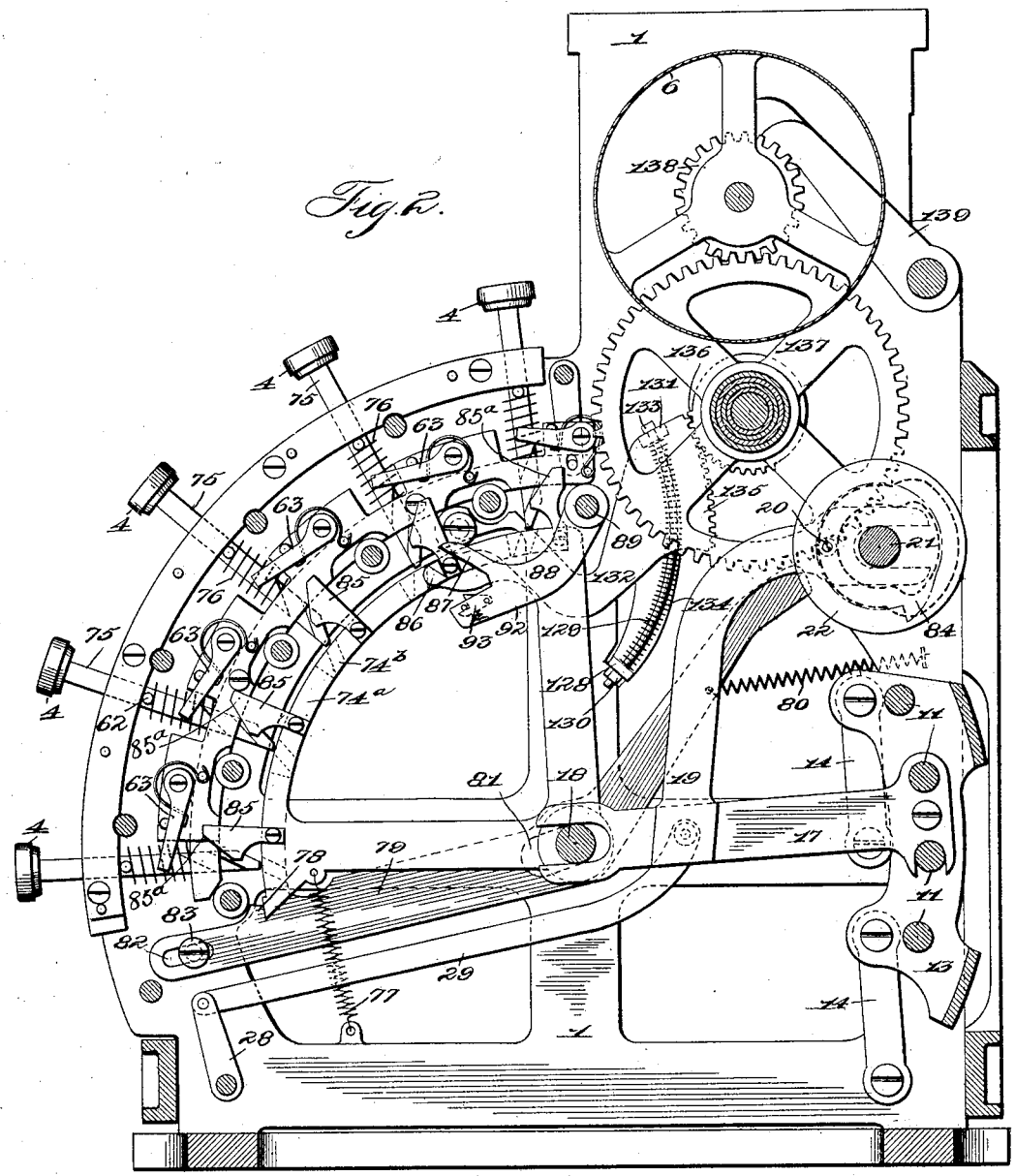
Figure 3:
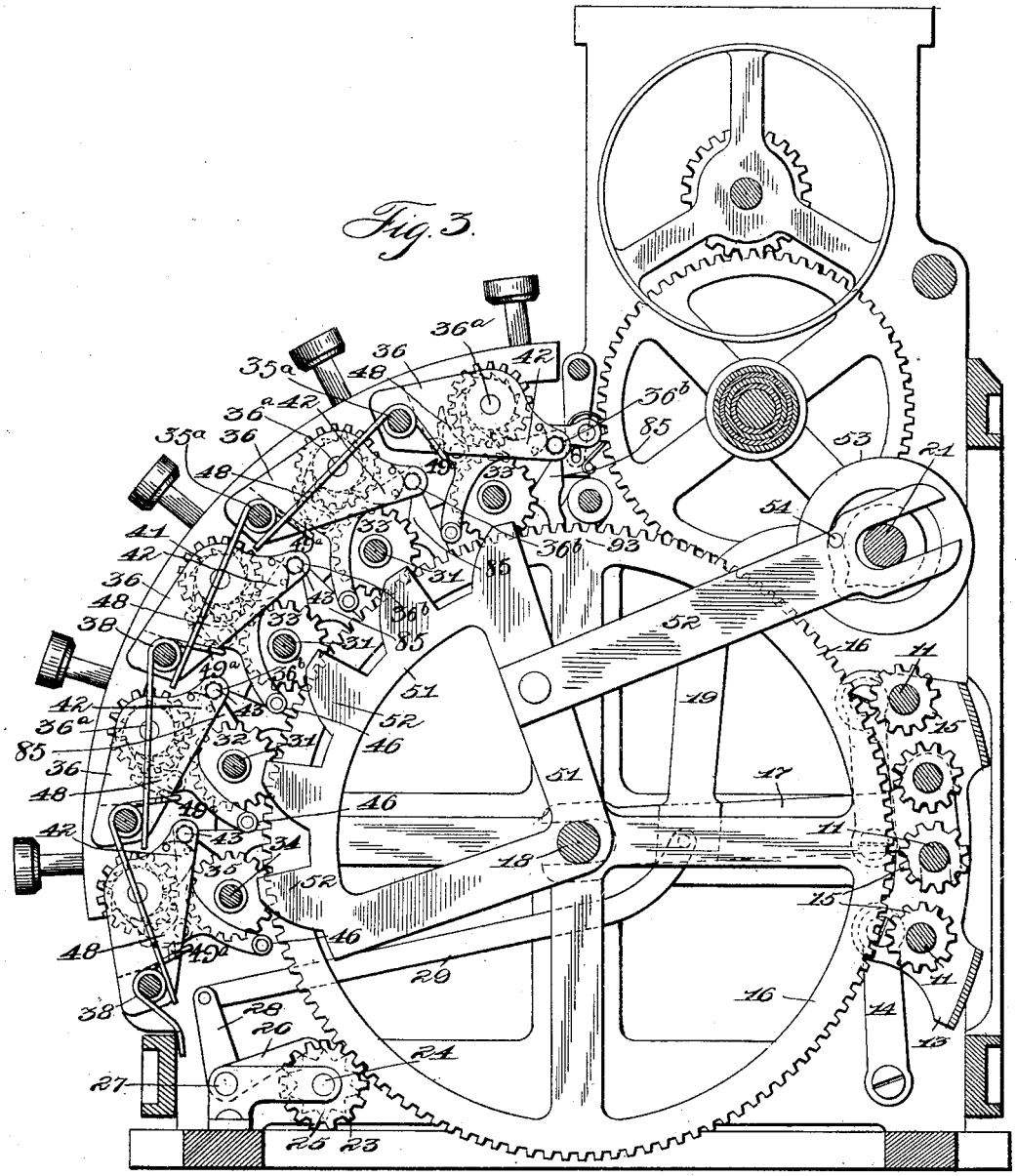

No. 700,171. Patented May 20, 1902.
J. P. CLEAL.
CASH REGISTER.
(Application filed Aug. 8, 1898.)
(No Model.) 11 Sheets—Sheet 1.

No. 700,171. Patented May 20, 1902.
J. P. CLEAL.
CASH REGISTER.
(Application filed Aug. 8, 1898.)
(No Model.) 11 Sheets—Sheet 2.

No. 700,171. Patented May 20, 1902.
J. P. CLEAL.
CASH REGISTER.
(Application filed Aug. 8, 1898.)
(No Model.) 11 Sheets—Sheet 3.

WITNESSES: INVENTOR.
Joseph P. Cleal.
BY
Alvan Macauley
ATTORNEY.

No. 700,171. Patented May 20, 1902.
J. P. CLEAL.
CASH REGISTER.
(Application filed Aug. 8, 1898.)
(No Model.) 11 Sheets—Sheet 5.

WITNESSES:
INVENTOR,
Joseph P. Cleal.
BY
ATTORNEY.

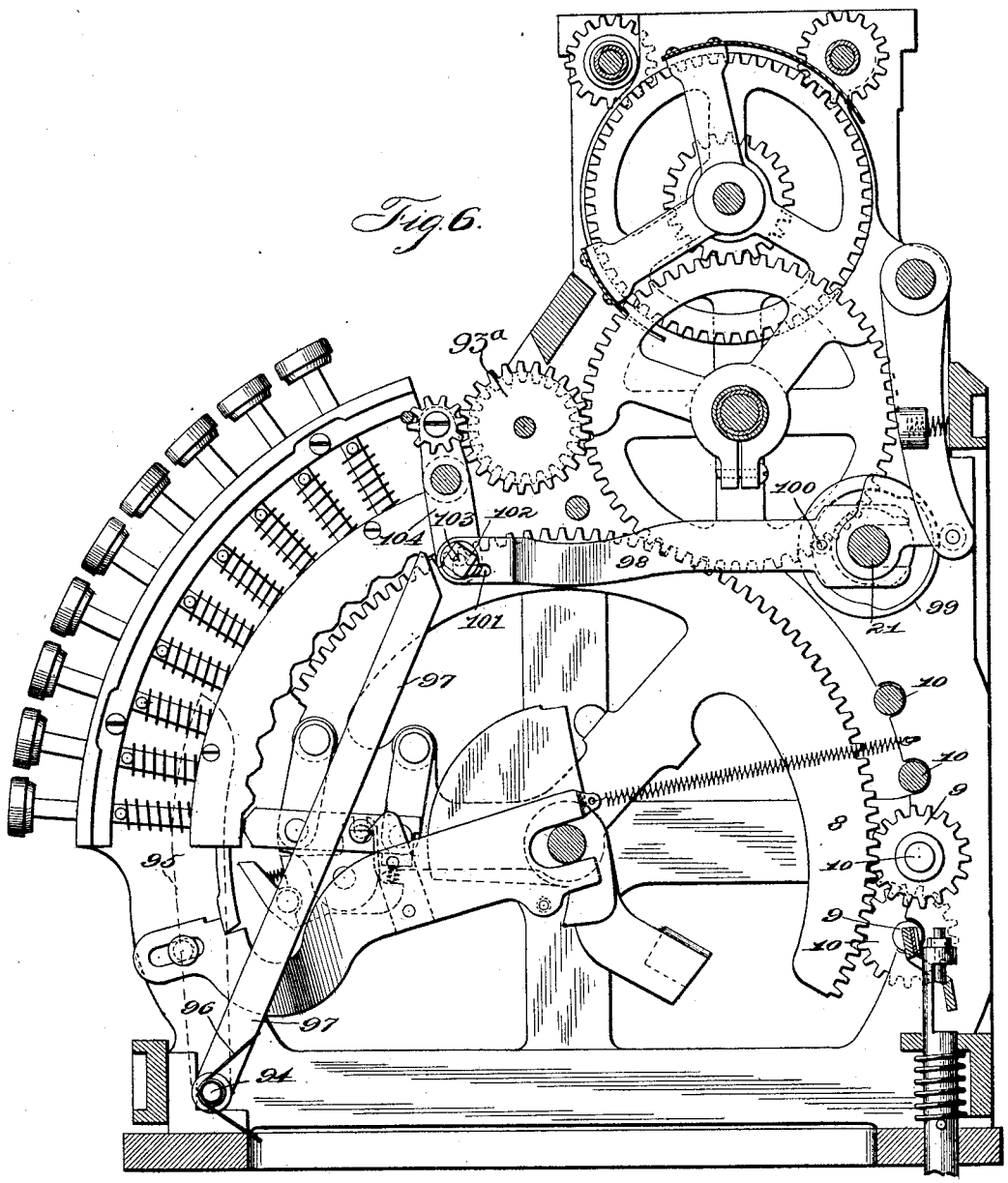

No. 700,171. Patented May 20, 1902.
J. P. CLEAL.
CASH REGISTER.
(Application filed Aug. 8, 1898.)
(No Model.) 11 Sheets—Sheet 7.
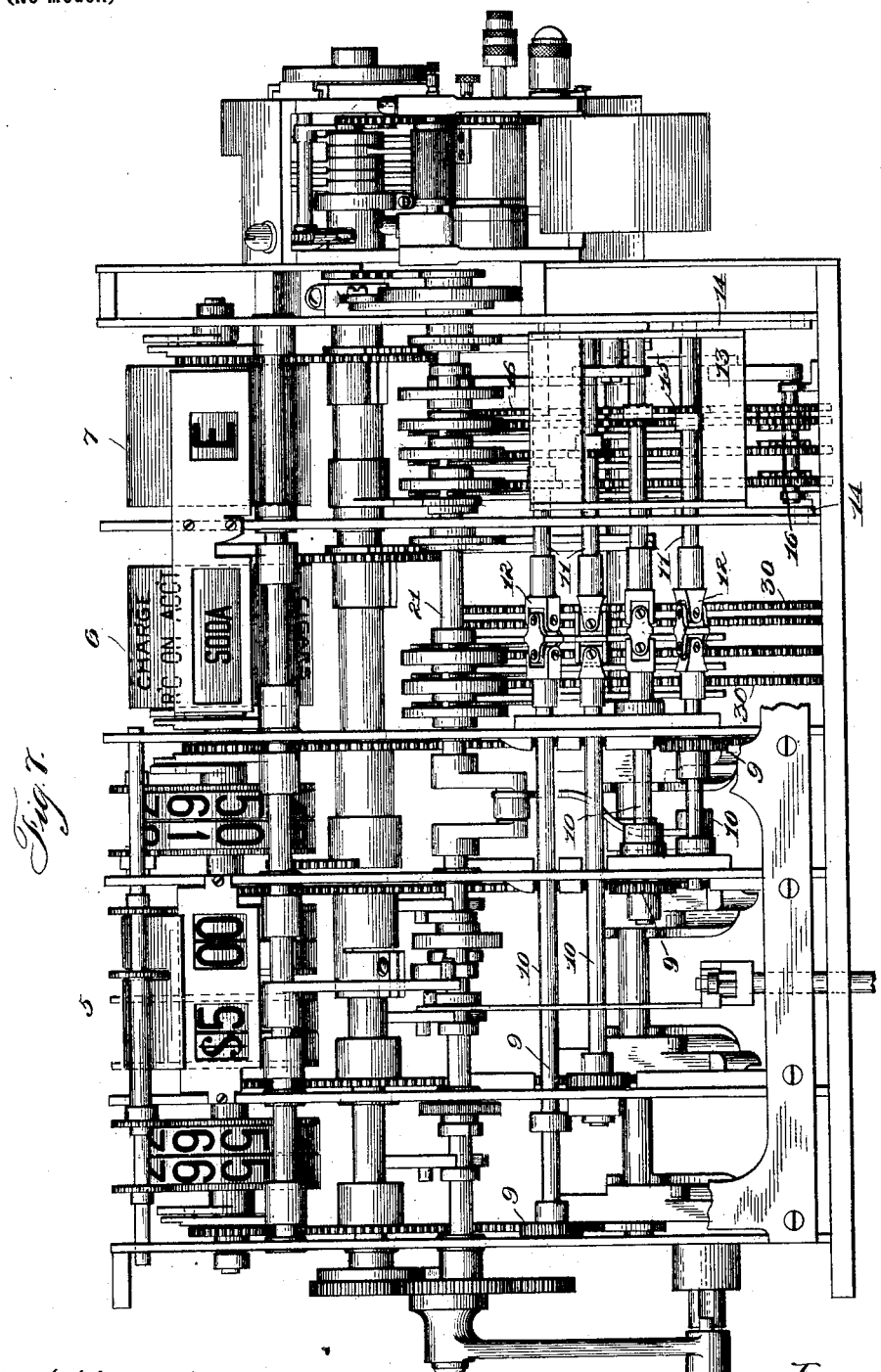

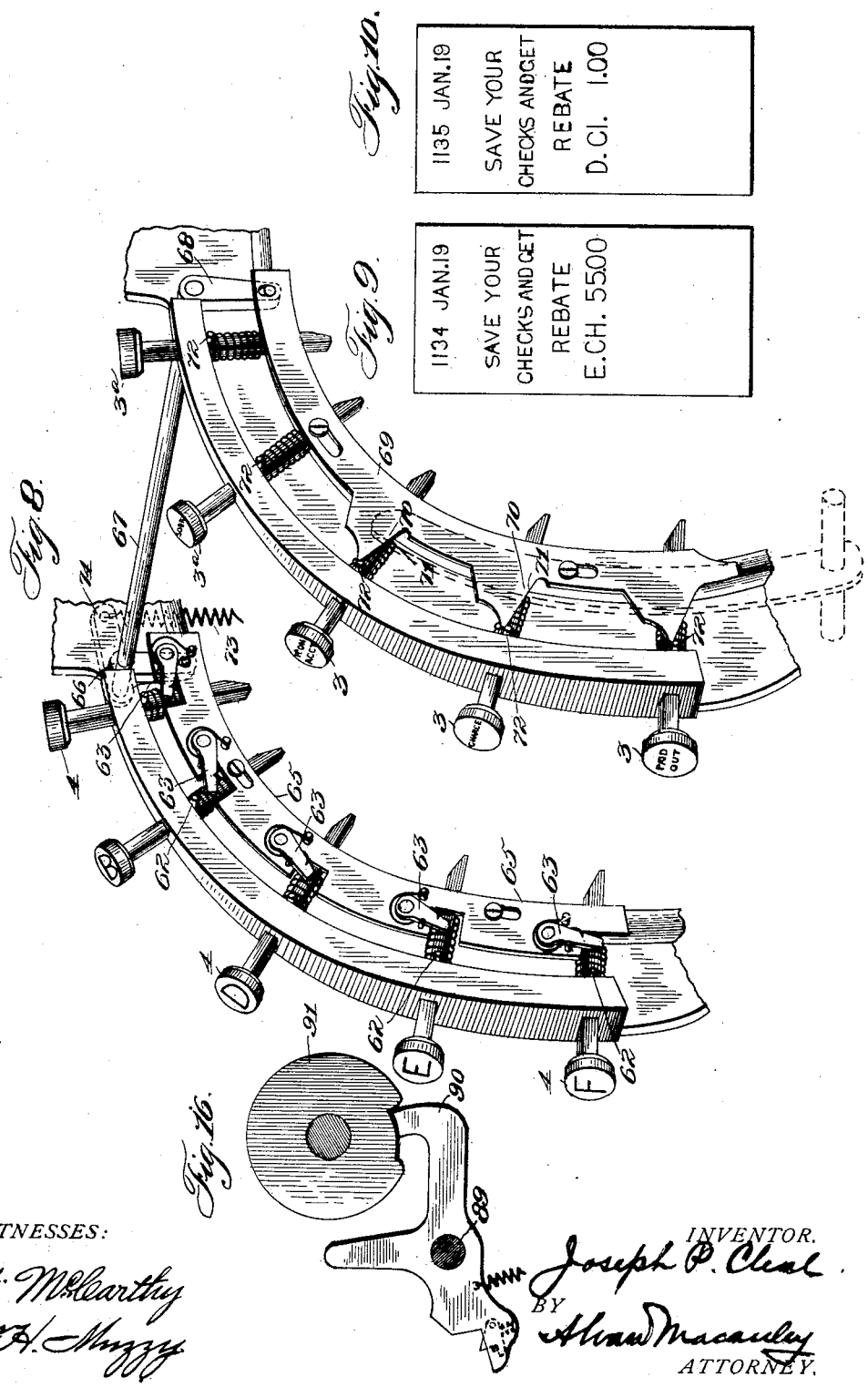

No. 700,171. Patented May 20, 1902.
J. P. CLEAL.
CASH REGISTER.
(Application filed Aug. 8, 1898.)
(No Model.) 11 Sheets—Sheet 9.
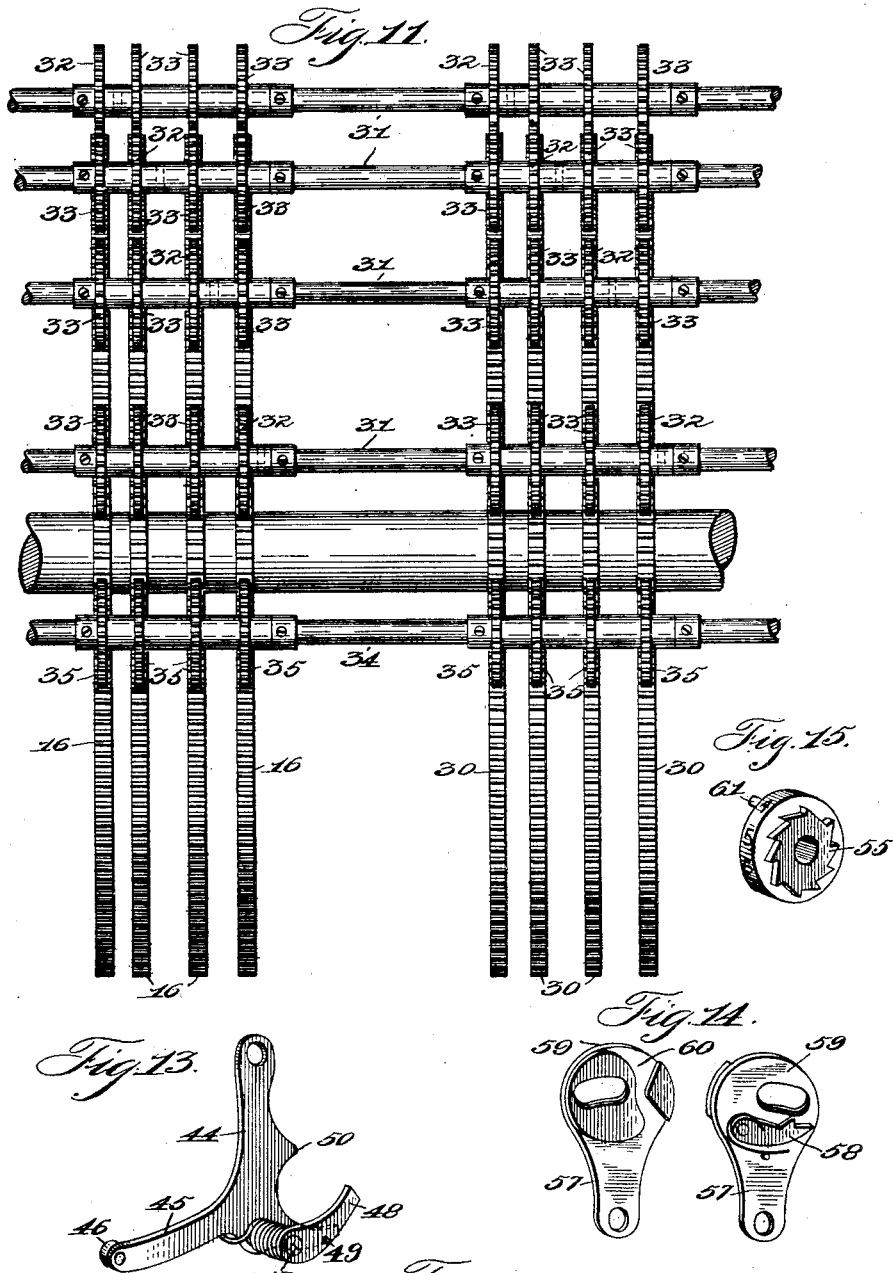

No. 700,171. Patented May 20, 1902.
J. P. CLEAL.
CASH REGISTER.
(Application filed Aug. 8, 1898.)
(No Model.) 11 Sheets—Sheet 10.

Witnesses
Inventor
Joseph P. Cleal
By Alvan Macauley.
his Attorney

THE NORRIS PETERS CO., PHOTO-LITHO., WASHINGTON, D. C.

No. 700,171. Patented May 20, 1902.
J. P. CLEAL.
CASH REGISTER.
(Application filed Aug. 8, 1898.)
(No Model.) 11 Sheets—Sheet 11.

FIG. 20.

Witnesses
W. McCarthy

Inventor
Joseph P. Cleal
By Hiram Macauley
Attorney

UNITED STATES PATENT OFFICE.

JOSEPH P. CLEAL, OF DAYTON, OHIO, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 700,171, dated May 20, 1902.

Application filed August 8, 1898. Serial No. 688,014. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in that class of registers more commonly designated "department" or "multiple-counter" registers.

The present invention is an improvement on the patent of Cleal and Reinhard, of April 13, 1897, numbered 580,378, and I will therefore hereinafter refer to the said patent for detail descriptions of several of the parts illustrated in connection with my own improvements.

One of the several objects of my invention is to provide an improved cash-register containing a totalizing-counter and a plurality of independent department-counters, any one of which latter may be thrown into operative connection with the actuating devices at will.

Another object is to provide such a machine as mentioned above with a printing device which will print the amount of the transaction and a character in connection therewith which will indicate into which of the department-counters the registration was thrown.

The invention consists of certain novel constructions, combinations, and arrangements of parts, all of which will be hereinafter more particularly set forth and claimed.

Figure 17:
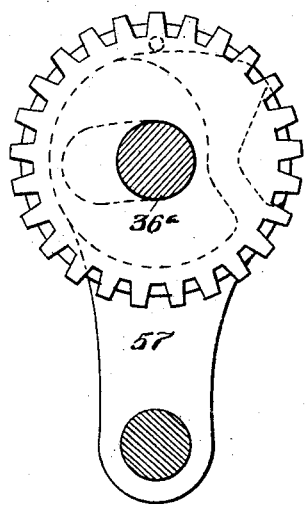
Figure 18:
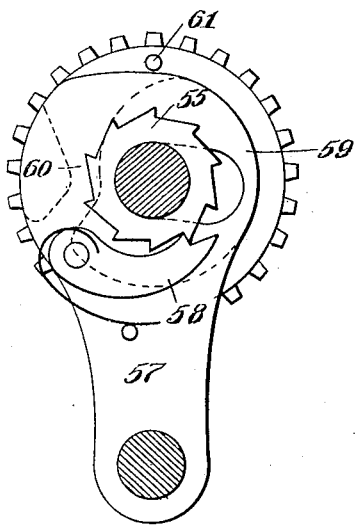
Figure 19:
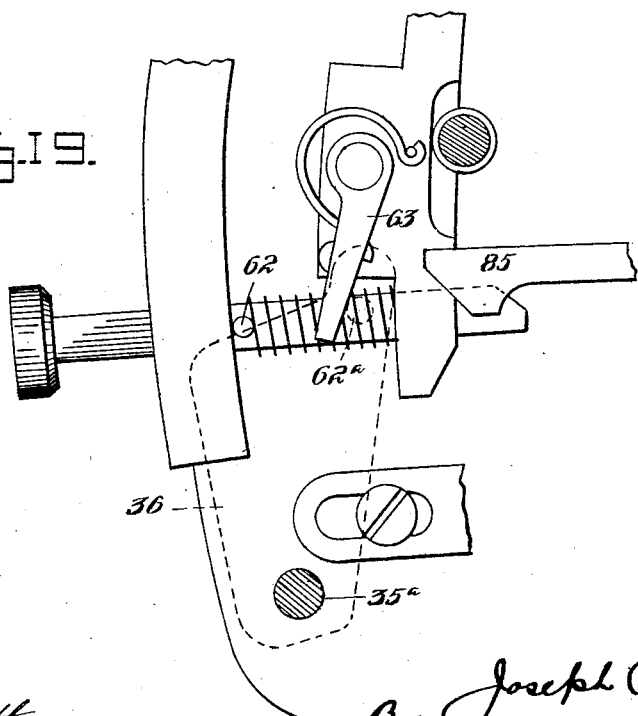

In the accompanying drawings, forming part of this specification, Figure 1 represents a front elevation of the devices embodying my invention. Figs. 2, 3, 4, 5, and 6 represent, respectively, vertical transverse sections, partly in elevation, through the same on the respective lines 2 2, 3 3, 4 4, 5 5, and 6 6 of Fig. 1. Fig. 7 represents a rear elevation, partly broken away, of my said improved devices. Fig. 8 represents an enlarged detail perspective view, partly broken away, of the two special banks of keys. Figs. 9 and 10 represent front elevations of the checks printed by my improved devices. Fig. 11 represents an enlarged front elevation of the coupling-shafts and the large operating-gears. Fig. 12 represents an enlarged detail perspective view of one of the counter-wheels. Fig. 13 represents an enlarged detail perspective view of one of the pivoted transfer-arms. Fig. 14 represents enlarged detail perspective views of another form of transfer-arm for the auxiliary counter-wheels. Fig. 15 represents an enlarged detail perspective view of one of the auxiliary counter-wheels. Fig. 16 represents an enlarged detail side elevation of the latching or locking device controlled by the keys. Fig. 17 represents an enlarged side elevation of one of the slotted transfer-pawls and the adjacent counter-wheels. Fig. 18 represents a similar view taken from the opposite side. Fig. 19 represents an enlarged detail side elevation of one of the special keys, its counter-frame and coöperating devices, and Fig. 20 represents a detail perspective view of the printing-segments and their connections.

In the said drawings, 1 represents the main frame; 2 2, the amount-keys; 3 3, the special-transaction keys; 4 4, the clerk's keys; 5, the amount-indicator; 6, the special-transaction indicator, and 7 the clerk's indicator. The registering mechanism proper, which is operated in connection with the keys 2 2 and the indicator 5, is substantially the same as that described in the aforesaid patent, with a few slight exceptions which will be hereinafter pointed out and described. One of these exceptions is the extension of the operating-rack segments 8, as shown, so that they mesh, respectively, with pinions 9 fast upon transverse shafts 10, journaled in the frame 1. Each of said shafts is provided with an auxiliary shaft 11, connected thereto by a compound swivel-joint 12, whereby said auxiliary shafts are caused to rotate with the main shafts, but may be moved out of alinement therewith at will without in any wise disturbing the relative rotary movements of the respective shafts. The said auxiliary shafts are journaled in a movable frame 13, supported by pivoted link-bars 14, and are each provided with a pinion 15, said pinions being arranged to respectively mesh with large gear-wheels 16, journaled in the main frame. Movement is imparted to the frame 13 to cause the pinions 15 to mesh with the gears 16 or be withdrawn from the same by an arm 17, rigidly secured to the frame and slotted at its free end to embrace and be guided by the main shaft 18. This arm is formed with an extension 19, having an angular slotted end and provided with a stud carrying an antifriction-roller 20. (See Fig. 2.) The slotted end of the extension 19 embraces a rotary operating-shaft 21, while the antifriction-roller 20 projects into a cam-grooved wheel 22, mounted fast on said shaft. It will thus be seen that the rotation of this shaft 21 upon the operation of the machine will cause the extension 19 to be moved first forward and then back, thus swinging the frame 13. The movements of the frame are such that it occupies a forward position during the forward movements of the pinions 15 and a rearward position during their reverse movements, thus only imparting their forward movements to the wheels 16. As the pinions 15 are withdrawn from mesh with the wheels 16 immediately upon the termination of the forward movement, it becomes imperative that some means be provided for positively checking the movements of said wheels to prevent overthrow or subsequent accidental movement. To accomplish this result, the said wheels each mesh with one of a series of pinions 23, which latter are loosely mounted upon a journal-shaft 24 and are each provided with a star-wheel 25. A plurality of pawls 26 are rigidly mounted upon a rock-shaft 27 and are arranged to engage the respective star-wheels when the shaft is rocked forward and disengage from the same upon the reverse movement of said rock-shaft. (See Fig. 3.) This rocking of the shaft is accomplished by a crank-arm 28, secured to one end of the same and connected by a pivoted link 29 with the movable arm 17. (See Figs. 2 and 3.) When the frame has moved far enough forward to cause the pinions 15 to engage the wheels 16, the pawls 26 have been disengaged from the star-wheels, thus leaving the pinions 23 free; but the instant the pinions 15 disengage from the wheels 16 the pawls 26 again descend and engage the star-wheels to lock the said pinions 23. By this means the wheels 16 are positively locked at all times when not being actuated by the pinions 15.

The wheels 16 in the present case are only four in number and coöperate, respectively, with the four banks of amount-keys 2. The four gear-wheels above mentioned are not sufficient according to my invention to accommodate the desired number of special counters and I therefore provide a duplicate series of gear-wheels 30, (see Figs. 7 and 11,) which are geared to the first-mentioned wheels 16, so as to turn therewith, by means of four transverse shafts 31, each having two pinions 32 fast thereon and meshing with the corresponding wheels 16 and 30. Each of said shafts 31 is further provided with six pinions 33, loosely mounted thereon and meshing with the respective wheels 16 and 30, so as to be rotated thereby and in turn communicate their movements to the counters, as hereinafter more fully described. A shaft 34, similar to the shafts 31, is journaled in the frame and is provided with eight loose pinions 35, which mesh, respectively, with the wheels 16 and 30, so as to turn therewith. By means of the above-described devices the corresponding wheels 16 and 30 are simultaneously moved, and thus rotate all of the pinions in mesh therewith to an equal degree. The said pinions, mounted on the shafts 31 and 34, are adapted to actuate the special counters when any of the same are forced into engagement therewith. Each of these special counters comprises a frame 36, pivotally mounted upon shafts $35^a$, whose ends are secured in the fixed frame, (see Figs. 1 and 3,) and a plurality of numbered wheels 37, journaled upon a suitable shaft $36^a$, mounted in said special-counter frame 36. Each of said frames is normally held in a retracted position by a spring 38, (see Figs. 1 and 3,) one end of which is fixed to the main frame and the other to the counter-frame, so that the latter must be positively forced down to cause the counter-pinions 39 to engage the operating-pinions.

As all of the special counters are of the same construction and operation, I will describe one of the same only, as such description will suffice for all.

Each of the counter-wheels 37 and excepting the last two on the left-hand side (see Figs. 1 and 2) is provided on one side with a pinion 39, a cam-wheel 40, and a ratchet-wheel 41. The said wheels 41 are engaged by spring-pressed pawls 42, mounted upon a transverse rod 43, whereby any backward movement of the wheels is prevented. (See Fig. 3.) The rod 43 further supports a plurality of transfer-arms 44, which are loosely mounted thereon and are each provided with an extension 45, carrying an antifriction-roller 46 and a laterally-projecting stud 47, upon which is mounted a spring-pressed pawl 48, (Figs. 3 and 13,) said pawls also engaging the ratchet-wheels 41 to move the same forward when the transfer-arms are operated. Each of the transfer-arms is further formed with a curved extension 49, having notches formed near the opposite ends thereof and engaged by one of a series of spring-pressed plunger-pawls $49^a$, mounted in the pivoted frame. By means of this structure the transfer-arm is held in its adjusted positions by the end of said plunger-pawl engaging the notches formed therein, said plunger being pressed back against the tension of its spring when the arm is moved one way or the other. When one of the counter-wheels has made a complete revolution, its cam-wheel 40 engages a nose 50, formed on its respective transfer-arm, and forces the latter rearward, Fig. 13, which movement brings the antifriction-roller on said arm into the path of one of a series of rock-frames 51, loosely mounted on the main shaft 18. Each of these frames is formed with a plurality of peripheral projections 52, having inclined edges which upon the movement of the frame contact with any of the antifriction-rollers that may lie in their paths and force the same, together with the transfer-arms carrying them, forward, so that a transfer will be accomplished. Each of the frames 51 receives its rocking motion from one of a series of operating-arms 52, pivoted thereto at one end and having a slotted end which embraces and is guided by the shaft 21. This shaft carries a plurality of cam-grooved wheels 53, each of which is engaged by one of a series of laterally-projecting pins 54, mounted on the respective arms 52, whereby the latter are moved back and forth as the cam-wheels are rotated.

The above description applies to the first four registering-wheels, which are operated by meshing with the auxiliary gears 32 33, which are driven by the large gear-wheels; but the remaining register-wheels, which receive no such movement from the large gear-wheels, are each provided with a ratchet-wheel 55, Fig. 15, which is engaged by one of a series of spring-pressed retaining-pawls 56, mounted upon the counter-frame for securing said wheels in position against reverse movement. The transfer to these two last-mentioned wheels is accomplished through the medium of two transfer-arms 57 57, pivoted on the counter-supporting shaft and each provided with a spring-pressed pawl 58, which engages its respective ratchet-wheel 55. Each of these transfer-arms is provided with an enlarged slotted head 59, which embraces the journal-shaft of the registering-wheels and is formed with a flaring-ended cam-groove 60, adapted to receive a pin 61, mounted on the adjacent register-wheel. When the last of the geared register-wheels has made one revolution, its pin 61 enters the groove 60 of the adjacent transfer-arm, and thus moves the latter to force the transfer-pawl into engagement with the ratchet-wheel of the first of the ungeared register-wheels to turn the same one tooth and is then withdrawn by the continued movement of the aforesaid pin.

As before mentioned, each of the special-counter frames is normally held away from the pinions operated by the large operating gear-wheels, so that the pinions of the register-wheels are out of mesh with said first-mentioned pinions. The five counters in the first bank, which represent the special counters for the different clerks, are operated, respectively, by the keys 4 4, Figs. 1 and 2, each of which is provided with a laterally-projecting pin 62. Each of these pins is arranged to contact with one of a series of pivoted spring-pressed pawls 63 when the key is forced inward to cause said pawl to contact with a laterally-projecting stud 62ª, mounted on its respective counter-frame. The continued inward movement of the key thus forces the counter-frame inward, so that the gears of its counter-wheels mesh with the pinions that are operated by the large gear-wheels. The said pawls 63 are mounted upon a segmental slide 65, Figs. 2 and 8, having slot-and-pin connection with the frame, and are arranged to be drawn out of alinement with the pins 62 upon the movement of said slide, and thus render said pins inoperative as far as the counter-frames are concerned. This movement of the slide is accomplished by means of a crank-arm 66, mounted upon a transverse rock-shaft 67 and pivotally connected to said slide at its upper end. The rock-shaft in turn receives motion from a crank-arm 68, rigidly secured to it and having pivotal connection with a segmental slide 69, also having slot-and-pin connection with the main frame. A plurality of projections 70 are formed on the slide 69 and held so that their incline edges 71 will normally lie in the paths of the pins 72 on the special keys 3 by a coil-spring 73, connected to a crank-arm 74, mounted on said shaft. When any one of the keys 3, which represent, respectively, "Paid out," "Charge," and "Rec'd on account," is pressed to bring its counter into operative position, the slide 69 is moved, thus withdrawing the pawls 63 out of the paths of the pins 62 and rendering all of the special clerk's counters inoperative. The two special keys 3ª are free to be operated without moving the slide 69, and thus do not prevent the operation of any of the clerk's special counters. Each of the two banks of special keys is provided with a segmental frame or detent-plate 74ª, journaled upon the shaft 18, Fig. 2, and formed in its periphery with a plurality of spaced inclined slots 74ᵇ, through which the grooved ends of the respective key-shanks 75 are arranged to extend when said keys are depressed. Each of said shanks is beveled at its end, so that when it is depressed against the tension of its spring 76 said end will engage the inclined wall of its respective slot 74ᵇ, and thus force its segment or detent-plate 74ª upward against the tension of a coiled spring 77, which normally holds it down. The lower portion of each segment normally engages a shoulder 78, formed on one of two similar slidable retaining-bars 79, so as to hold the latter out against the tension of coil-springs 80 80, which connect them with the main frame. Each of these levers is formed with an elongated slot 81, through which the shaft 18 projects, and also provided with an end slot 82, through which passes a screw 83, to secure the lever movably on the frame. (See Fig. 2.) When one of the segment-frames or detent-plates is raised, as above described, its lower end passes free of its respective shoulder 78, and thus permits the retainer-bar 79, carrying the shoulder, to move rearward and lock the segment in its elevated position until the retainer-bar 79 is again forced forward. Thereby the depressed key is prevented from returning to normal position and the other keys are locked against operation. This forward movement of each bar is accomplished by one of two cams 84, mounted upon the shaft 21 and adapted to engage the end of the retainer-bar 79, whereby the detent-plate is released and the operated key is permitted to return to normal position. Each of the detent-plates 74ª is further provided with a plurality of radiating extensions 85, each having an inclined face and a square end 85ª. (See Fig. 2.) By reference to Fig. 3 of the drawings it will be seen that each counter-frame has a nose 36ᵇ, projecting toward the rear of the machine and normally resting upon the square end of the respective extensions 85. It will be observed that by this construction the counter-frames are normally locked in outward position and are only released when the extensions 85 are withdrawn from contact with them by the movement of the segments. This movement of the segments takes place during the initial movement of the key and before the latter has commenced to depress the counter-frame. The return movement of said segments causes the inclined faces of the extensions 85 to contact with the counter-frames, and thus assist them in returning to their normal positions. Again, the segment or detent 74ª of the clerk's key-bank is provided with a laterally-projecting lug 86, which when the segment is raised contacts with a jaw 87, formed on an arm 88, fast to a transverse rock-shaft 89, Fig. 2, thus rocking said shaft to disengage a locking-pawl 90, Fig. 16, mounted thereon from a locking-disk 91, which latter is mounted on one of the driving-gears in substantially the manner described in the patent to H. Cook, No. 464,294, dated December 1, 1891. The upward movement of the arm 88, Fig. 2, causes its lower jaw 92, which carries a spring-pressed pawl 93, to move almost but not quite into the path of the lug 86 on the aforesaid detent or segment 74ª. Each of the banks of keys is provided with a detent similar to the detent 74ª and adapted to coöperate with one of a series of arms similar to the arms 88 in all respects, with the exception that they are not any of them provided with the nose 87. Consequently the machine is not unlocked by the operation of any key except one of those in the clerk's initial bank. The operation of a clerk's initial key, however, releases the crank because the movement of the key has rocked shaft 89, thereby throwing the locking-pawl 90 partly but not wholly out of the notch in locking-disk 91, so that the subsequent movement of the crank will turn the locking-disk and force the locking-pawl wholly out of the notch and upon the periphery of the disk. This last movement of the locking-pawl further rocks the shaft 89 and moves the series of spring-pressed pawls carried by arms 88 into the path of the lugs 86 of segments 74ª, thereby preventing movement of any additional key till the crank is returned to normal position, when the locking-pawl falls again into the notch in disk 91, thereby relocking the crank. It will be understood that there is one arm 88, carrying its spring-pressed pawl, for each bank of keys, and when the crank is turned in those banks in which a key has been pressed, and thereby the segment 74ª moved rearward, the said spring-pressed pawls move up under and against the lugs 86, and those banks in which no key has been pressed are thereupon locked by said pawls moving in front of the said lugs and locking the segments 74ª against movement, and consequently preventing the keys in such banks from being pressed. As the segments 74ª descend in those banks in which a key has been pressed the lug 86 rides over the pawl 93 by depressing it against the tension of its spring. After the lug has passed the segment 74 cannot again be elevated by operating a key until the arm 88 is permitted to assume its normal position at the end of the stroke of the machine. By this means any fraudulent operation of the machine is prevented, as one transaction must be completed before another can be commenced.

By means of the above-described devices it is absolutely impossible to operate the machine until one of the special clerk's keys has been operated to rock the shaft 89. When either one of the three special keys 3 is operated, it is desirable to throw the totalizing-counter 93ª out of operative connection, so that the special transaction will not be registered thereon, but will be printed, and to accomplish this result I provide a rock-shaft 94, Fig. 6, journaled in the main frame and having a curved arm or lever extension 95, which is normally held in proximity to the inner ends of the key-shanks by a spring 96, mounted on said shaft with its opposite ends bearing against a portion of the main frame, and a lever 97, also mounted on said rock-shaft and having its upper end beveled and arranged to contact with and raise the front end of an operating-bar 98. The said lever 95 is arranged to be operated to rock the shaft 94 and lever 97 by two pins 72 of the special keys 3 striking the same upon the operation of said keys. This operation causes the rearward movement of the lever 97. The bar 98 receives its motion from a cam-grooved wheel 99, mounted upon the shaft 21 in such manner as to receive an antifriction-roller 100, mounted upon the side of the slotted end of said bar 98, this slotted end being guided by embracing the said shaft 21. The forward end of the bar 98 is formed with an angular slot having a short vertical leg 101, having a long horizontal leg 102, in which latter a pin 103 normally rests for actuating a coupling-lever 104, similar to that described in the aforesaid Cleal and Reinhard patent. When the pin 103 is in the short leg 102, the reciprocation of the bar 98, as above described, causes a corresponding movement of the coupling-lever 104, and thereby the pinions carried upon the upper ends of the coupling-levers 104 will be rocked into mesh with the wheels of the counter 93ª, which will be thereby coupled to their actuating mechanisms, so as to be moved by the immediately subsequent movement of the main gears 16. When the lever 97 is moved forward by the operation of one of the special keys 3, Fig. 8, its inclined upper end engages the end of the bar 98 and forces the same upward, so that the pin 103 may play back and forth in the elongated slot 101 without operating the lever 104.

Having thus fully described my improved registering devices, I will pass on to the special roller-indicators 6 and 7, employed in connection therewith, Figs. 1 and 7. The said indicator 6 bears indicating characters for the transactions represented by the special keys 3 and 3ª, Fig. 8, and is set for operation upon any one of the same being depressed. This setting operation is accomplished by laterally-projecting studs 105, 106, 107, 108, and 109, Fig. 5, respectively, which are each provided with an antifriction sleeve or roller 110. When either of the keys carrying the studs 106 and 107 is depressed, the antifriction-sleeves of said studs contact with and operate a pivoted segmental plate 111, mounted on the main frame and formed with a plurality of segmental slots 112, through which pass the journal-shafts 31. When the key carrying the stud 105 is depressed, the sleeve 110, carried by said stud, contacts with and operates a pivoted lever 113, which in turn contacts with a pin 114, mounted on the plate 111, to operate the latter. The sleeves on the studs 109 and 108 are arranged to contact, respectively, with pivoted levers 115 and 116, mounted on the frame and adapted to contact, respectively, with pins 117 and 118, mounted on projections 119 and 120 of the plate 111. It will be seen that by this means the plate 111 is moved different distances, according to which one of the keys 3 or 3ª is depressed. In order to cause the variable movements of the plate 111 to be transmitted to the proper printing-segment for the special transactions, I form the extension 119, Fig. 5, with a segmental rack 122, which meshes with rack-teeth formed on a lock-segment 123, fast to the printing-segment sleeve 124. The teeth formed on the lock-segment are arranged to be engaged by a pivoted locking-pawl 125, which is operated by a cam 126 on the shaft 21, and thus lock the printing-segment and prevent movement of the indicator 6 during the printing operation and until the crank is started on the succeeding operation of the machine. The plate 111 and its connected levers are normally held up either in contact with or in proximity to the antifriction-sleeves 110 by a coil-spring 127, connecting the extension 120 with the main frame. The said extension 120 is further provided with a laterally-projecting arm 128, Fig. 2, through which loosely projects one end of a curved rod 129, said rod being secured against displacement by a nut 130. The upper end of the said rod passes through an apertured lug 131, formed on a pivoted lever 132, and is secured against displacement by a nut 133. The said rod supports a coil-spring 134, the opposite ends of which bear against the respective projections 128 and 131. When the plate 111 is operated, as before described, the arm or projection 128 is elevated to a greater or less extent, as the case may be, and thus puts the spring 134 under tension to move the lever 132 when the latter is free to move, as hereinafter described. This lever is formed with a segmental rack 135, which meshes with gear-teeth 136, formed on the extension-hub of a gear-wheel 137, which latter in turn meshes with a pinion 138, fast on the shaft of the said indicator 6. An alining and locking pawl 139, similar to the alining and locking pawls described in the aforesaid patent, secures the indicator 6 in the position to which it is adjusted and so holds it until the succeeding operation of the machine. The indicator is provided with a guard and flash similar to those described in the before-mentioned patent, with the exception that the guard is apertured at the sides at both the back and the front of the machine.

Figure 4:
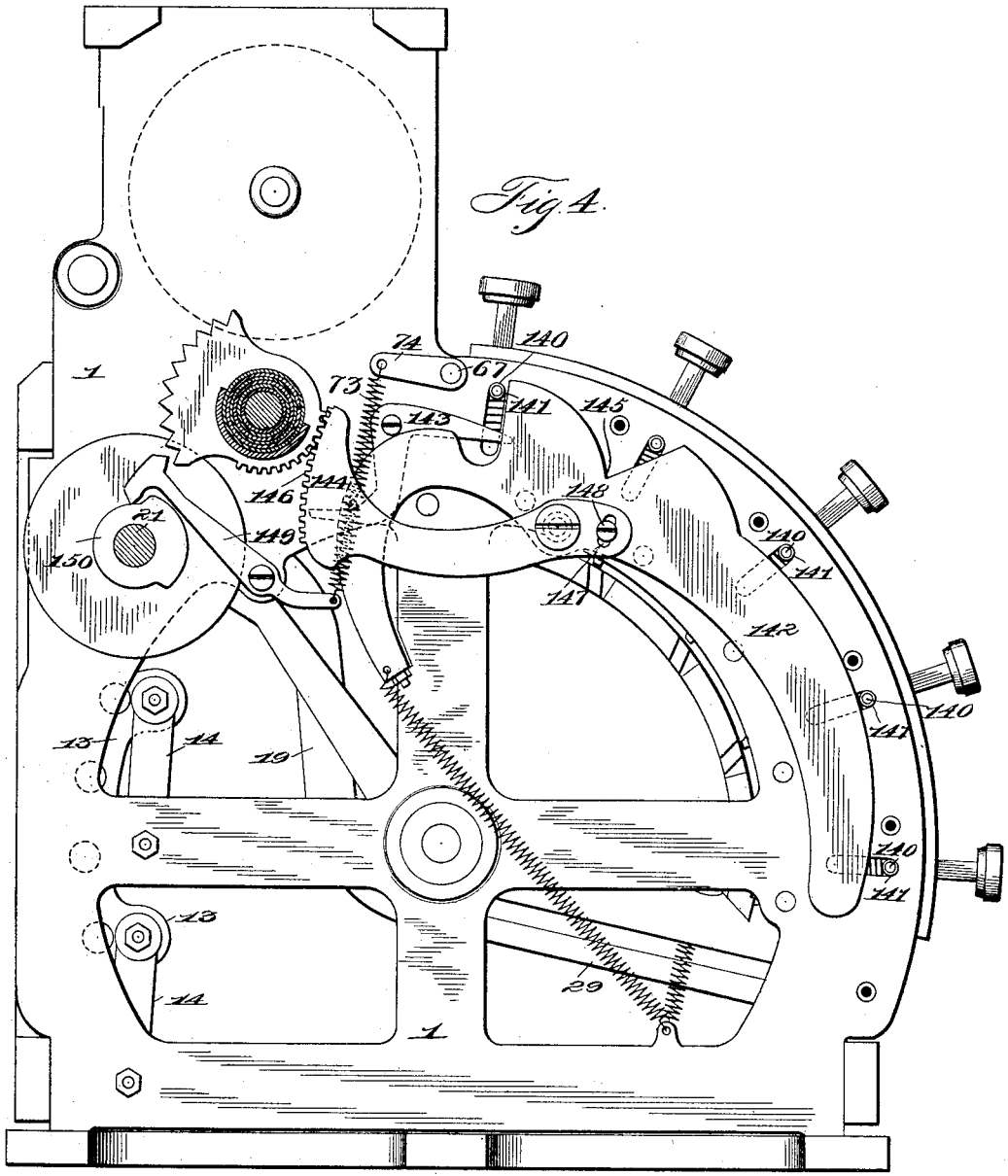
Figure 5:
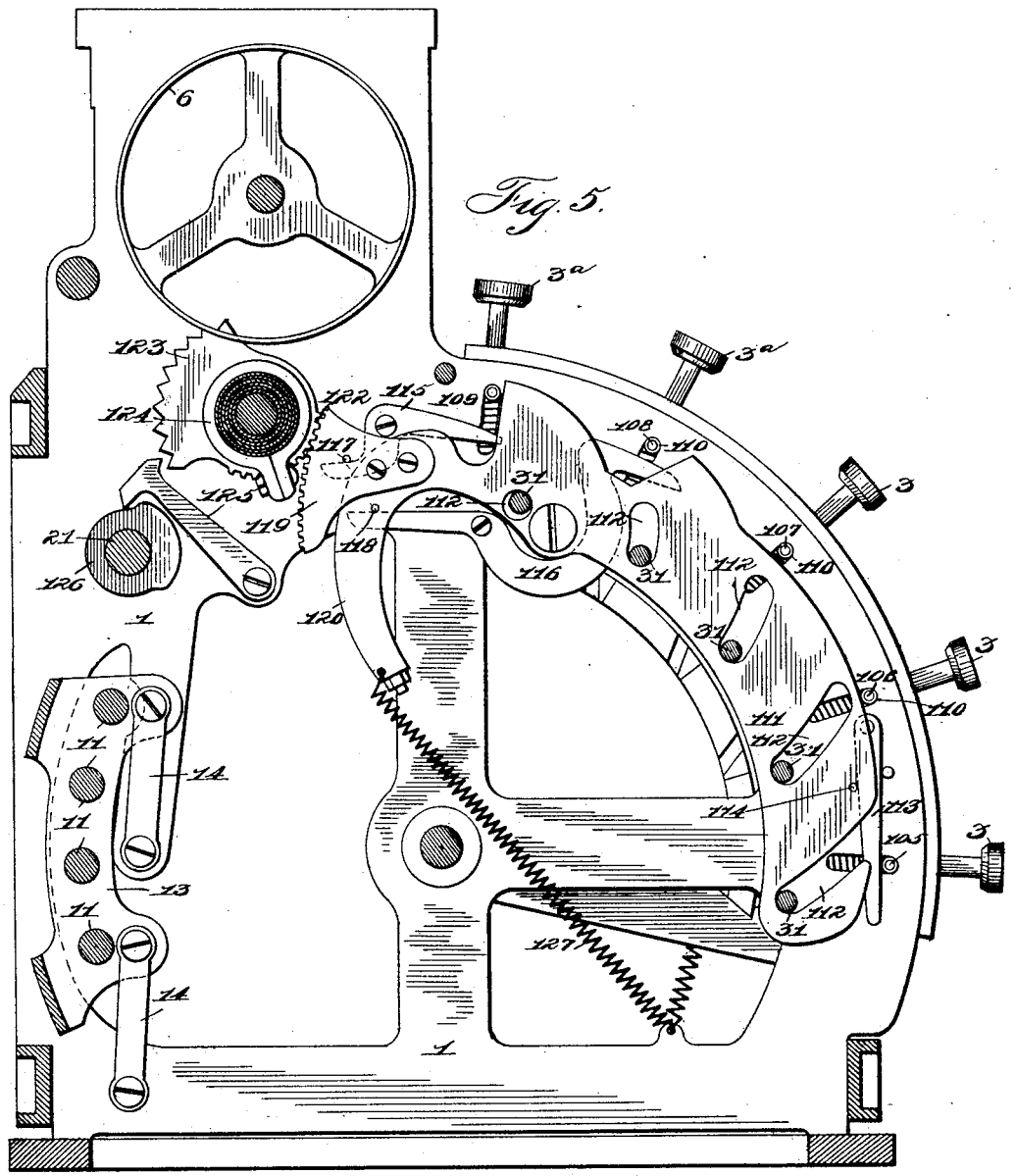

The keys 4 4 of the first special bank are similar to the keys 3 and 3ª in that they are provided with laterally-projecting pins 140, Fig. 4, carrying antifriction-sleeves 141. The antifriction-sleeves of the three lower keys are adapted to engage a pivoted plate 142, somewhat similar to the plate 111, to operate the same, while the upper-key sleeve is adapted to contact with and operate a pivoted lever 143, which engages a pin 144, mounted on the plate 142. The sleeve of the remaining key of this bank is adapted to contact with the inclined wall of a recess 145, formed in said plate, for moving the latter. The connection between the plate 142 and its indicator 7 is substantially the same as between the plate 111 and its indicator 6, and I will therefore not repeat the description of the same. The connection, though, between the plate 142 and its printing-segment is slightly different from that between the plate 111 and its printing-segment in that its operating-segment 146 is pivotally connected to it and formed with an elongated slot 147, through which projects an adjusting-screw 148. By this structure the segment 146 may be adjusted in relation to the plate 142 and set in said adjusted position by the screw 148. Another slight difference is the attachment of the lower end of the spring 73 to the locking-pawl, whereby the latter is normally held down against its operating-cam 150.

The printing device proper shown in connection with my present improvement is substantially the same as that shown and described in the aforesaid patent, and the respective printing-segments 124ª of the same are connected to the above-mentioned operating-segments, as well as the regular-amount segments of the machine, by nested sleeves 124 and 124$^b$, which construction is old and well known in the art and will need no further description here.

It will be seen from the foregoing that to operate the machine one of the keys 4 must first be depressed, thus throwing its respective counter into mesh with the large operating-gears, so as to receive motion therefrom. Should one of the keys 3 be depressed, any of the counters of the first bank which might previously have been in engagement with the intermediate gears will be released and thrown out of such engagement, as before described, so that the amount of the transaction is thrown into the special counter which is operated by the key 3. The keys 3$^a$ 3$^a$ do not prevent either the totalizing-counter or any of the clerk's counters from operating, and thus when one of the same is depressed three different counters are operated. It will be observed that the segment 8 of the last special bank is operated, even though the counters of said bank are rendered inoperative, as above described, and thus sets both the indicator and the printing-segment for said bank, substantially in the manner described in the aforesaid patent.

I have referred to the transverse shafts 10 as flexible shafts and described them as each having substantially a universal joint 12 between their ends. It will be understood, of course, that the functions of the flexible shafts can be accomplished by a modified construction. For example, these shafts might be made without the joints 12 and held at their right-hand ends (see Fig. 7) in their supporting-frames, while the left-hand ends could be supported in the rocking frame 13, in which case, of course, where the shafts pass through intermediate bearings the latter would have to be elongated in order to permit of the vibrations of the shafts when the mechanism is actuated, and it will be readily recognized that in so complicated a mechanism as my present invention many various modifications in the actual construction employed may be made without departing from the spirit of my invention.

Having thus described my invention, what I claim as new, and desire to secure by Letters Patent, is—

1. In a cash-register, the combination with two independently-mounted banks of counters, each comprising a series of independent counters, of a registering mechanism, devices for throwing the counters into connection with the registering mechanism, and means connecting the counters of the respective banks whereby when a counter of one bank is brought into connection with the registering mechanism for subsequent operation, the counters of the remaining bank are rendered inoperative in connection with their throwing devices.

2. In a cash-register the combination with registering and printing mechanism, of a plurality of special counters arranged to be brought into connection with the registering mechanism at will and means connected to the special counters whereby a special printing device for a certain counter may be operated without throwing the counter into operative position.

3. In a cash-register the combination with a registering mechanism, of a series of counters having special printing devices for designating the operated counters and arranged to be brought into connection with the registering mechanism at will, and means adapted to be operated by a number of said counters for rendering the remainder inoperative in connection with the registering mechanism but operative in connection with the special printing devices.

4. In a cash-register the combination with a registering mechanism, of a plurality of counters having special indicators and arranged to be thrown into connection with the registering mechanism at will, and means whereby the indicator of a certain counter may be set without throwing that counter into connection with the registering mechanism.

5. In a cash-register the combination with a registering mechanism, of a counter controlled by a special key, a slide carrying devices through which the counter may be thrown into operative position and a second special key arranged to move said slide to prevent the operation of said counter through its key.

6. In a cash-register, the combination with a registering mechanism, of special counters controlled by special keys, a slide arranged to be operated by a number of said keys, and movable counter-throwing devices mounted on said slide and arranged to be operated by a number of said keys so that the counters of said latter keys will be thrown or not according to the position of the slide.

7. In a cash-register the combination with the registering mechanism, of a counter a slide carrying a pivoted pawl, a special key arranged to normally strike said pawl and thus throw the counter into connection with the registering mechanism, and another key for moving said slide to remove the pawl out of the path of its keys.

8. In a cash-register the combination with the registering mechanism, of a plurality of special counters keys for bringing said counters into connection with the registering mechanism, a slide for establishing or breaking the connection between a portion of said keys and their counters, and another slide arranged to be operated by a number of the keys and connected to the first-mentioned slide.

9. In a cash-register the combination with the operating mechanism and a counter, a special key or other means for establishing an operative relation between said counter and the operating mechanism, a second counter, a second special key for establishing an operative relation between the second counter and said operating mechanism, a printing device arranged to print whenever said counter is brought into operative relation with the operating mechanism, means controlled by said first-mentioned special key for unlocking the operating mechanism, means controlled by said second special key for disestablishing or preventing operative relation between said first-mentioned counter and the operating mechanism, and a printing device arranged to print whenever said first-mentioned special key is operated.

10. In a cash-register, the combination with a registering mechanism and a totalizing-counter, of a series of special counters and their keys, and means coöperating with a number of said special keys whereby when any of the same is operated the counters of the keys not connected to said means are rendered inoperative in connection with their keys without preventing the operation of the latter and the totalizing-counter is also rendered inoperative.

11. In a cash-register, the combination with a totalizing-counter, of two independent banks of special counters, keys for throwing the counters of the special banks into operative position at will, locking devices for the machine controlled by one of said special banks of keys and means operated by the remaining special bank for throwing the totalizing-counter and the counters of the companion special bank out of operative position.

12. In a cash-register, the combination with a registering mechanism, of an indicator, a series of keys, a lever for operating said indicator, a spring connected to said lever, a stop for limiting the movement of said lever and means connected to the keys for putting the springs under tension to operate the lever and moving said stop.

13. In a cash-register, the combination with a registering mechanism, of a series of flexible shafts operated by the same, special counter-operating devices arranged to be operated by said shafts and means for moving said shafts into or out of connection with said devices.

14. In a cash-register, the combination with a register mechanism, of a series of shafts operated by the same, a movable frame, a series of auxiliary shafts mounted in said frame and flexibly coupled to the first-mentioned shafts special counter-operating devices arranged to be operated by the auxiliary shafts and means for moving the frame to different positions to break or make the connection with the operating devices.

15. In a cash-register, the combination with a registering mechanism, of a series of rack-segments for operating the same, a plurality of flexible shafts having pinions meshing with said segments, a series of special counter-operating gear-wheels, other pinions on the flexible shafts and means for moving said shafts to bring said latter pinions into mesh with the gear-wheels or disengage them from the same.

16. In a cash-register, the combination with a registering mechanism, of a series of keys, a pivoted plate arranged to be engaged by a portion of said keys, pivoted levers adapted to be operated by the remainder of said keys to move the pivoted plate and a printing device arranged to be operated by the pivoted plate being moved different distances by the respective keys.

17. In a cash-register, the combination with a plurality of counters arranged in banks of an operating mechanism, keys for throwing any one of the counters into mesh with the operating mechanism, and a slide arranged to be operated by the keys of one bank to render the counters of the remaining banks inoperative.

18. In a cash-register, the combination with a plurality of counters arranged in banks, of an operating mechanism, keys for throwing any one of the counters into mesh with the operating mechanism, a slide coöperating with one bank of keys and adapted to be moved by the operation of the same, a second slide coöperating with another bank of keys, counter-operating pawls mounted on said slide and normally lying in the path of the keys and means connecting the two slides whereby the movement of the first-mentioned slide will withdraw the pawls from the paths of their respective keys.

19. In a cash-register the combination with the registering mechanism, of the keys, a detent-plate arranged to engage an operated key and hold it in operative position, means for moving the detent-plate to release the keys near the end of the registering operation, means for locking the detent as soon as said keys are released and for releasing it upon the completion of the registering operation.

20. In a cash-register, the combination with a registering mechanism, of a plurality of keys, a locking frame or detent for said keys, a lock for the registering mechanism means for releasing the locking-frame, devices connecting the locking-frame and lock for operating the latter upon the movement of the former and means for preventing more than one operation of the locking-frame during a single operation of the machine.

21. In a cash-register, the combination with a registering mechanism, of a series of special counters, keys for forcing said special counters into connection with the registering mechanism, a locking frame or detent for said keys and projections on said frame for positively forcing the counters out of connection with the registering mechanism.

22. In a cash-register, the combination with a registering mechanism, of a plurality of keys, a locking frame or detent for said keys, a pivoted arm arranged to be operated by said frame, an independently-movable pawl on said arm adapted to engage said frame, and a machine-locking pawl arranged to be operated by said arm.

23. In a cash-register, the combination with an operating mechanism, of a series of counters, a movable frame having projections which positively force the counters away from the operating mechanism and keys arranged to force the respective counters into engagement with the operating mechanism.

24. In a cash-register, the combination with a plurality of keys, of an indicator, a pivoted lever connected to the same, a rod connected to said lever, a spring surrounding said rod and engaging said lever and means connecting the keys and spring for putting the latter under greater or less tension according to the key operated.

25. In a cash-register the combination with the operating mechanism and a totalizing-counter, of two banks of special counters, two banks of special keys for establishing an operative relation between the special counters and the operating mechanism at will, locking devices for the entire operating mechanism controlled by the keys of one of said banks and means operated by the keys of the other bank to prevent or disestablish the operative relation between the counters of said other bank and the operating mechanism.

26. In a cash-register the combination with a plurality of keys, of an indicator, a spring connected to the indicator, and means connecting the keys and spring whereby the latter is put under different degrees of tension independently of the movement of the indicator to move the latter to a greater or less extent.

27. In a cash-register the combination with a plurality of keys, of an indicator, a spring connected to the indicator, means connecting the keys and spring for putting the latter under different degrees of tension independently of the movement of the indicator, and a locking device for the indicator released by the operation of the machine.

28. In a cash-register the combination with a plurality of keys, of an indicator, a spring connected to the indicator, a stop device connecting the keys and the spring and adapted to put said spring under different degrees of tension independently of the movement of the indicator and also limit the movement of said indicator.

29. In a cash-register the combination with the driving mechanism comprising a segment or its equivalent arranged to receive a differential movement according to the value of the operated key, a series of special counters, a series of gears arranged to actuate the special counters, and a series of flexible shafts each bearing two pinions, one at either end, one of the pinions on each shaft being in permanent mesh with the said segments respectively and the pinions upon the opposite ends of said shafts being arranged to be thrown into or out of engagement with the gears to actuate the special counters, substantially as described.

30. In a cash-register, the combination with the registering mechanism, of a plurality of movable transfer-frames, a plurality of counters, the wheels of which are each provided with a ratchet-wheel, a plurality of transfer-arms arranged to be engaged by said transfer-frames and moved in one direction, pawls mounted on said arms and engaging said ratchet-wheels, and means connected to the counter-wheels for moving said arms positively in an opposite direction.

31. In a cash-register, the combination with a plurality of operating-gears, of a movable frame, operating devices mounted on the frame and arranged to be brought into connection with the gears, locking devices for the operating-gears and means connecting the locking devices and the movable frame so that the locking devices will engage the gears when the operating devices are disengaged from the same and vice versa.

32. In a cash-register the combination with the totalizing-counter and normally locked operating mechanism, of a special counter, a special key coöperating therewith to establish an operative relation between said counter and the operating mechanism, a second special counter, a second special key coöperating with said second counter to normally establish an operative relation between said second special counter and the operating mechanism, and means whereby when the said first-mentioned special key is operated subsequently to said second special key the operating mechanism will be thereby unlocked, but said second counter will not be brought into registering relation with the operating mechanism even though its special key remains depressed.

33. In a cash-register the combination with the normally locked operating mechanism, of a special counter, a special key coöperating therewith to bring said special counter into operative relation with the operating mechanism, a second special counter, a second special key coöperating therewith and arranged to bring the same into operative relation with the operating mechanism, and means whereby when the first-mentioned special key is operated subsequently to said second special key the counter which coöperates with said second special key will be brought into operative relation with the operating mechanism, while the counter which coöperates with said first-mentioned special key will be prevented from operative relation with said operating mechanism even though its special key remains depressed.

34. In a cash-register the combination with the registering mechanism and a totalizing-counter normally in operative engagement with the registering mechanism, of a special counter and key, a second special counter and key and means whereby when said second special counter is brought into operative relation with the registering mechanism the other special counter and the totalizing-counter are both prevented or disconnected from such operative engagement with the registering mechanism even though the key of this latter special counter remains depressed.

35. In a cash-register the combination with operating devices, of a movable frame, a series of shafts mounted on said frame and flexibly connected to said operating devices, gears on said shafts, counter-operating gears and means for moving the frame to bring the gears together or separate them.

36. In a cash-register the combination with operating means, flexible shafts operated by the same, counter-operating devices arranged to be operated by said shafts and means for moving said shafts into or out of connection with said devices.

37. In a cash-register the combination with a registering mechanism of a series of special counters and keys and means connected to a number of said special counters whereby when any one of the same is operated the remaining counters not connected to said means are rendered inoperative irrespective of the action of their keys.

38. In a cash-register the combination with registering and printing mechanism, of a plurality of special counters, keys arranged to set the respective counters, and also a corresponding printing-type and means for disestablishing the relation between the keys, and the counters so that said keys will set the types only.

39. In a cash-register the combination with the registering mechanism, of a plurality of independent counters, independent operating-keys for the respective counters, for moving the same into engagement with the registering mechanism, an operating device interposed between one of said keys and its counter for moving the latter and means for withdrawing said device when the other key is operated.

40. In a cash-register the combination with registering and printing mechanisms, of a series of keys arranged to control said registering and printing mechanisms and means whereby said keys may be rendered inoperative as with respect to the registering mechanism but still be capable of controlling the printing.

41. In a cash-register the combination with a series of keys, of a locking-detent for the same, a latch for the machine, a trip-arm for operating said latch arranged to be actuated by the detent, and movable means mounted on said arm and coöperating with the detent to allow movement of the same in one direction but prevent movement in an opposite direction.

42. In a cash-register the combination with a series of keys, of a locking-detent for the same, a latch for the machine, a trip-arm for operating said latch, arranged to be actuated by the detent, and a movable locking device mounted on said arm and arranged to engage the detent after the latter has been operated to prevent a second operation during the same operation of the machine.

43. In a cash-register having a printing attachment, the combination with a special counter, and means to designate by printing upon a paper strip whenever operative relation is established between said special counter and the operating mechanism, of a second counter, and means arranged so that when operative relation is established between the operating mechanism, and said second counter, the first-mentioned counter will be released or held from operative relation therewith, but the said printing means will not be affected thereby.

44. In a cash-register, the combination with registering and printing mechanisms, of a special key controlling a special counter, a second special key controlling both a second counter and printing devices, and means whereby upon the first-mentioned special key being operated subsequently to the said second special key, its coöperating printing mechanism will be adjusted to printing position, but operative relation will not be established between its counter and the operating mechanism.

45. In a cash-register, the combination with registering and printing mechanisms, of a special key controlling a special counter, a second special key controlling a special counter, and a coöperating printing device and means whereby when the said second special key is operated previously to the said first-mentioned special key, both the counter controlled by said special key and its printing device will be in operative position, but upon the subsequent operation of said first-mentioned key before the registering mechanism is actuated, the counter coöperating with the said second special key will be released or held from operative position.

46. In a cash-register, the combination with the registering and printing mechanism, of a special key controlling a special counter, a second special key controlling a second special counter and a printing device, and means whereby when said first-mentioned key is operated its coöperating counter will be put into operative relation with the registering mechanism and also the counter controlled by the second special key will be put out of operative relation so that on the subsequent operation of said second key its counter will not be moved into operative relation with the registering mechanism.

47. In a cash-register, the combination with the registering mechanism, and a main or totalizing counter, of a special key controlling a counter and an indicator, a second special key controlling a second counter and a second indicator, and means whereby when said first-mentioned key is operated the counter and indicator will be moved or adjusted to operative position and the counter coöperating with said second special key will be moved or held from such operative relation, though its indicator will not be affected.

48. In a cash-register, the combination with the driving mechanism of two banks of special counters, keys for said counters and means connecting said banks and so arranged that the throwing of a counter in one of said banks will prevent an operative relation being established between the counters of the other bank and the registering mechanism without preventing the operation of the keys of this latter bank.

49. In a cash-register, the combination with the registering mechanism of a special key 4 arranged normally to establish an operative relation between its special counter and the registering mechanism, a second special key 3 arranged to do likewise for a second special counter, and means to prevent a subsequent establishment of an operative relation between the registering mechanism and the special counter until after the registering mechanism has been actuated.

50. In a cash-register, the combination with the registering mechanism, of special keys 4, a counter controlled by the special key 4, a slide 65 carrying operating devices for the counter, and means actuated by a second special key 3, to move the slide and release the counter, substantially as described.

51. In a cash-register, the combination with the registering mechanism, of a counter controlled by a key 4, a slide 65 carrying a pawl or lever 63 arranged to be moved by the key so as to contact with the counter and throw the latter into mesh with the registering mechanism, a special key 3, and means actuated thereby for moving the slide 65 to release the counter.

52. In a cash-register, the combination with the registering mechanism, of the counter normally out of operative engagement with the driving mechanism, means carried on a slide 65 for operating the counter, a special key 3 and a slide 69 arranged to be actuated by the key 3 and to simultaneously move the slide 65 to release the counter from operative relation.

53. In a cash-register, the combination with a registering mechanism and a totalizing-counter movable into connection with the registering mechanism, of a special counter, a second special counter similarly movable, and means for throwing the said second special counter into operative engagement with the registering mechanism and for simultaneously releasing the special counter and totalizing-counter, or for preventing an operative relation being established between said last-mentioned counter and the registering mechanism prior to the succeeding actuation of the machine.

54. In a cash-register, the combination with a registering mechanism, of a counter and an indicator, a special key controlling the counter and indicator, a second special key controlling a second counter and a second indicator, and means operated by the second special key for preventing the operation of the counter of the first-mentioned key but allowing the operation of its indicator.

55. In a cash-register, the combination with a registering mechanism, of a plurality of counters having special indicators and arranged to be thrown into connection with the registering mechanism at will and a slide operated to prevent certain counters being thrown into connection with the registering mechanism without effecting the setting of the indicators of said counters.

56. In a cash-register, the combination with a registering mechanism, of an indicator, a series of keys, a stop for the indicator arranged to be set by the keys, a spring for operating the indicator also arranged to be set by the keys and means for locking the indicator during the setting movements of the keys and subsequently releasing it upon the operation of the registering mechanism.

57. In a cash-register, the combination with two independently-mounted banks of counters, of counter-operating devices, means for actuating said devices when the counters are moved into connection therewith, and devices connecting the respective banks of counters whereby when a counter in one bank is brought into connection with the operating devices the counters in the remaining banks are prevented from being brought into such connection.

In testimony whereof I affix my signature in the presence of two witnesses.

JOSEPH P. CLEAL.

Witnesses:
ALVAN MACAULEY,
PEARL N. SIGLER.